United States Patent [19]

Strout et al.

[11] Patent Number: 4,484,233
[45] Date of Patent: Nov. 20, 1984

[54] HIGH SPEED, HIGH RESOLUTION PROGRAMMABLE MULTIFORMATTING HARDCOPY VIDEO PRINTER

[75] Inventors: Emery G. Strout, Huntington Beach; Armen N. Mancini, Fountain Valley, both of Calif.

[73] Assignee: Schiff Photo Mechanics, Santa Ana, Calif.

[21] Appl. No.: 431,262

[22] Filed: Sep. 30, 1982

[51] Int. Cl.³ ............................................. H04N 1/24
[52] U.S. Cl. .................................... 358/302; 364/523
[58] Field of Search ................ 358/302, 901; 313/372, 313/467–469; 364/523

[56] References Cited

U.S. PATENT DOCUMENTS

| | | | |
|---|---|---|---|
| 3,141,106 | 7/1964 | Kapany | 358/901 |
| 3,184,753 | 5/1965 | Koster | 358/130 |
| 3,210,597 | 10/1965 | Siegmund | 358/302 |
| 3,422,218 | 1/1969 | Byer | 358/300 |
| 3,732,367 | 5/1973 | Teranishi | 358/302 |
| 3,786,182 | 1/1974 | Kaneko | 358/244 |
| 3,818,131 | 6/1974 | Emmons | 358/296 |
| 3,858,081 | 12/1974 | Rehkoph | 313/467 |
| 4,027,315 | 5/1977 | Barney | 354/76 |
| 4,285,587 | 8/1981 | Schiff | 354/124 |
| 4,343,543 | 8/1982 | Schiff | 354/124 |

Primary Examiner—Howard W. Britton
Attorney, Agent, or Firm—Gausewitz, Carr, Rothenberg & Edwards

[57] ABSTRACT

A high speed, high resolution programmable multiformatting hardcopy video printer is devised by using a fiber optic face plate on a cathode ray tube wherein a fiber optic face plate has an electrophoretically deposited phosphor which is activated by the cathode ray tube elements. Photosensitive paper is positioned by a motorized printer in front of the face plate and exposed to the full frame video image found on the face plate by contact printing. A multiple number of full frame images may then be imprinted into the photosensitive layer of the paper across the horizontal axis according program control. The paper is then moved vertically in front of the face plate, again according to program control to allow one or more additional horizontal rows of full frame images to be imprinted in the photosensitive paper. The paper is then fixed and developed so that the latently imprinted images are rendered visible. Control and coordination of the mechanical printer mechanism with the exposure through fiber optic face plate is effected by a programmable microprocessor.

12 Claims, 7 Drawing Figures

HIGH SPEED, HIGH RESOLUTION PROGRAMMABLE MULTIFORMATTING HARDCOPY VIDEO PRINTER

BACKGROUND OF THE INVENTION

1. Field of the Invention

The present invention relates to the field of hardcopy printers which take a video input signal and reduce the video signal to a paper copy.

2. Description of the Prior Art

Hardcopy printers, used to convert a video signal into a graphic paper copy, have customarily used a CRT display which is optically focused on a recording medium such as conventional wet processed film or dry developed, photosensitive papers. A typical system for producing a telephonically transmitted image on electrostatic printing paper is shown by Byer, "Television System with a Hardcopy Printer," U.S. Pat. No. 3,422,218 where the full face image from a storage CRT is optically transmitted through a lens system onto the developing media. However, such systems are slow in that the light intensity from such a projected CRT image is relatively low and requires long exposure times.

Other prior art hardcopy printers have employed direct contact printing with a photosensitive media exploiting the use of a line of fiber optics on the face plate of a CRT wherein light from the CRT is transmitted through the fiber optic bundle to a photosensitive medium which is in direct contact with the bundle. For example, see Emmons, "Fiber Optic Cathode Ray Tube with Anti-Static discharge means," U.S. Pat. No. 3,818,131. However, such systems normally use a narrow slot or line of fiber optic bundles so that a frame is printed line by line in sequence as the paper or photosensitive media is moved across the slot of fiber optic bundles. While sufficient light intensity is obtained, printing is nevertheless slowed by exposing the photosensitive medium line by line. In addition, resolution is at best mediocre.

Full frame image printers using fiber optic face plates such as shown by Koster, "An Apparatus for Exposing Photosensitive Material," U.S. Pat. No. 3,184,753 and Kaneko et al, "Frame by Frame Video Image Recording Apparatus," U.S. Pat. No. 3,786,182 have been devised, but are as a practical matter employed only for the exposure of motion picture film inasmuch as the size of the frame, which can be simultaneously exposed in a reasonable amount of time with acceptable resolution, is confined to frame sizes normally used in conventional motion picture film. Generally, such film sizes are 35 mm or smaller which sizes are of virtually no practically usefulness as a hardcopy printer which requires at least a reasonable fraction of a conventional sheet of paper in order to provide useful hardcopy.

Therefore, what is needed is some means whereby a high speed, high resolution hardcopy printer for video signals cans be devised to produce hardcopy printout of a conventional size. What is further needed is such a multiformat, hardcopy printer which can also be programmably configured in one of a plurality of formats.

BRIEF SUMMARY OF THE INVENTION

The present invention is a method and apparatus for printing a video image on hardcopy to produce a high speed, high resolution graphic image on hard copy in a selected one of a plurality of formats.

The method of the present invention includes the steps of controllably positioning a photosensitive medium in contact with a flat rectangular fiber optic faceplate on a cathode ray tube wherein the faceplate includes an electrophoretically deposited phosphor thereon. The electrophoretically deposited phosphor on the fiber optic faceplate is selectively activated in response to a video signal applied to the cathode ray tube. A corresponding luminescent pattern is thus generated on the faceplate. The photosensitive medium is then exposed to the pattern generated on the faceplate to permanently imprint the pattern on the photosensitive medium which is in contact with the face plate. The medium is then moved to a mechanism for developing and fixing the pattern which is imprinted into the medium thereby in a permanent visual image. The developed and fixed medium is then delivered for visual inspection by the user.

By this combination of steps a video signal corresponding to the imprinted image is coupled to the cathode ray tube and imprinted on the medium to produce a permanent visual image therein through the use of a electrophorectically deposited phosphor-bearing fiber optic faceplate which is in contact with the medium and which produces as a result a high resolution hardcopy image at a high speed.

The method also includes the steps where the cathode ray tube and its connected fiber optic faceplate are translated relative to the medium to expose previously unexposed portions of the medium to thereby imprint multiple images. The medium is also moved relative to the fiber optic face plate of the cathode ray tube so that a two dimensional array of imprinted images is formed in the medium. Movement of the medium and the cathode ray tube is programmably controlled so that a series of images are formed in the medium according to a two dimensional array configured in a selected one of a plurality of possible formats.

The apparatus of the present invention comprises a paper supply for supplying photosensitive paper, a printing mechanism for exposing the paper, which printing mechanism includes a flat platen, a first mechanism for moving the paper from the paper supply to and through the printing means, a cathode ray tube having a flat face plate, a second mechansim for selectively disposing the cathode ray tube with respect to the paper, a developing mechanism for fixing the latent image imprinted into the photosensitive paper, and a third mechanism for controlling the movement of the operation of the apparatus. More specifically, the photosensitive material is moved by the first mechanism between the face plate and the platen. Although the illustrated embodiment shall refer to the photosensitive material as a dry silver paper, any conventional photosensitive material could be used, including film. The platen is selectively actuated to press the paper against the flat face plate. The cathode ray tube is selectively disposed with respect to the paper in a direction generally perpendicular to the direction of movement of the paper relative to the cathode ray tube and platen. A video image is reproduced on the face plate of the cathode ray tube. The paper which is positioned between the face plate and the platen is selectively exposed to the video image. A latent image is then formed on the photosensitive paper. A full frame video image is displayed upon the face plate of the cathode ray tube when an exposure of the paper is made in any instance. Each point of the video image on the face plate is thus simultaneously imprinted on the photosensitive paper. After exposure of the paper, the paper is moved to and through the developing mechanism from the printing mechanism by the first mechanism after the photosensitive paper has been selectively exposed to the full frame video images on the face plate of the cathode ray tube. The third mechanism controls movement of the paper through apparatus generally by controlling the first mechanism in combination with the other elements of the present invention and controls the operation of the apparatus and selective dispositon of the cathode ray tube by the second mechanism with respect to the paper in the printing mechanism. The third mechanism is coupled: to the first mechanism which moves the paper through the apparatus; to the platen for pressing the paper against the cathode ray tube; to the cathode ray tube for controlling the image produced thereon; to the second mechanism for moving the cathode tube with respect to the paper in the printing mechanism; and to the developing mechanism. By reason of this combination of elements, a high speed, high resolution multiformatted image copier is provided which can print multiformatted images on paper in a selected one of plurality of formats.

These and other embodiments of the present invention are more specifically described in the Detailed Description of the Preferred Embodiments which can be understood by viewing the following figures wherein like elements are referenced by like numerals.

DETAILED DESCRIPTION OF THE PREFERRED EMBODIMENTS

The present invention is a high speed, high resolution hardcopy printer for printing a plurality of graphic images in a selected one of a plurality of formats from video signals. High speed is obtained by forming the graphic image on a fiber optic, flat, face plate having a useful area of three by four inches on a six inch diagonal cathode ray tube. High resolution is obtained by using a high quality fiber optic face plate which has an electrophoretically deposed phosphor on the back of the fiber optic face plate. Photosensitive paper taken from a continuous roll is moved and cut so that a single sheet of the paper is positioned in a printing station and pressed by a platen against the fiber optic faceplate. The faceplate is selectively positioned along the horizontal axis of the paper by means of a microprocessor controlled stepper mechanism, which horizontal axis is perpendicular to the movement of the paper. The size of the full frame image on the fiber optic faceplate as well as the distance by which the fiber optic faceplate is translated along the horizontal axis of the paper determines the number of full frame images which are latently imprinted into the photosensitive paper across its horizontal axis. The paper is then controllably moved, and one or more additional rows of full frame images are imprinted on the cut sheet. The cut sheet is then moved from the printing station to a developing station which develops and fixes the latent images in the photosensitive paper thereby rendering them visible. The developed and fixed paper is then delivered to the user.

The input to the cathode ray tube, which forms the video image on the fiber optic faceplate, is a conventional video signal taken from any conventional source of video signals. In the preferred embodiment, it is contemplated that the multiformatted hardcopy printer of the present invention will be employed in combination with medical equipment of a wide variety of types such as ultrasonic, CT, digital, NMR, and x-ray scanners, all of which have a standardized video output. In addition, computer graphic instruments having a composite video output could also be used as signal sources.

Figure 1:
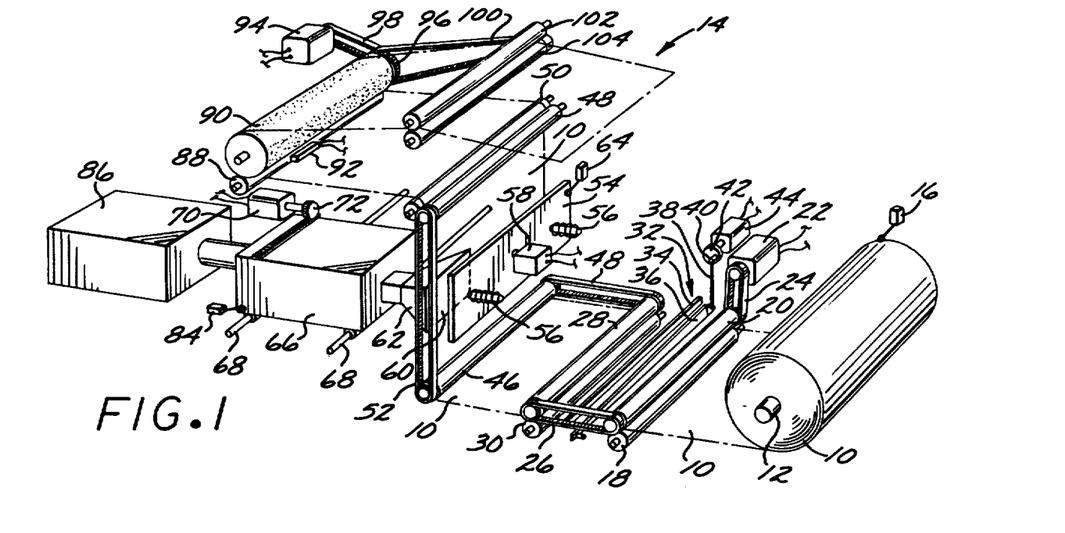
FIG. 1 is a perspective view of the operative elements and their arrangement, shown for simplicity with the structural cabinet in which they are housed deleted.
Figure 4:
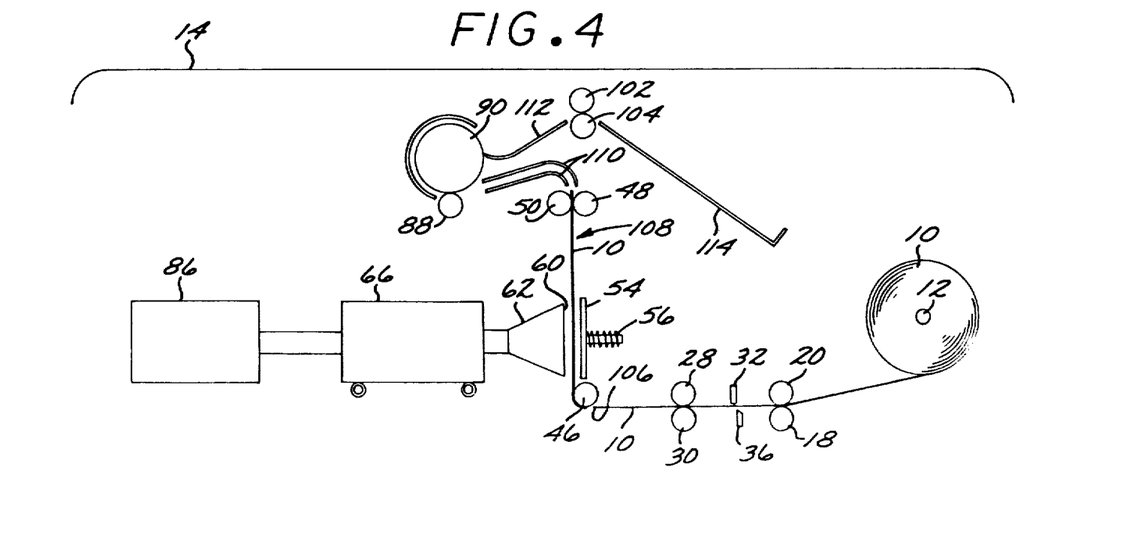
FIG. 4 is a digrammatic side view of the apparatus shown in FIG. 1.

FIG. 4 shows in diagrammatic side view a summary of the operation of the elements of the apparatus shown in more detail in connection with FIG. 1. Paper 10 from a continuous roll spooled on roller 12 is feed through a pair of rollers 18 and 20 and passed through a conventional cutting bar through a conventional second pair of rollers 28 and 30. From rollers 28 and 30 paper 10 is then lead to a lower roller 46 which changes the direction of paper 10 and delivers the paper to a print station. The paper is moved from roller 46 upwardly to a pair of feed rollers 48 and 50. Paper 10 is moved into the print station between a solenoid operated flat platen 54 and a flat face plate 60 of a cathode ray tube 62 contained within a chassis 66. Flat platen 52 is moved inwardly away from face plate 60 by means of a solenoid shown in FIG. 1. When solenoid 58 is nonactuated, spring loaded pins 56 cause platen 54 to bear tightly against paper 10, pressing paper 10 against face plate 60. Cutter bar 36 is acutated so that paper 10 is cut along line 106 and is continually fed without the creation of a gap between adjacent sheet segments. Therefore, as a first sheet 108 is being exposed in the print station, a second sheet segment is following and can be immediately fed into the print station as sheet 108 is moved upwardly to the developing station. Cutter bars 36 are actuated at the appropriate time to cut the second sheet to the desired length. Meanwhile, the exposed sheet is moved through a pair of fixed guides 110 shown in FIG. 4 to a developing drum 90 and roller 88. Developing drum 90 is a conventionally heated developing drum which intensifies the latent image imprinted within paper 108 and fixes the image therein, making the imprinted image permanently visible.

Paper 108 is then delivered from heated drum 90 over guide 112 shown in FIG. 4 through delivery rollers 104 and 102 to a delivery tray 114 which is external to the metal cabinet which has been deleted from the Figures for clarity. It must be assumed throughout the following description that all portions of the operative elements other than delivery tray 114 are included within a light tight enclosure which also serves as the structural framework to which each of the elements are connected, fixed, coupled or related. The mechanical aspects of the preferred embodiment and its mode of operation can best be understood by viewing FIG. 1 which shows a perspective view of the operative elements of the apparatus with the housing, in which the elements are originally mounted, omitted for clarity. The paper supply, generally denoted by reference character 14, includes a continuous roll of photosensitive paper 10 mounted on a journaled roller 12. In the preferred embodiment, paper 10 has a photosensitive layer using a dry silver photoreactant well known to the art. The amount of paper 10 on roller 12 is sensed by a sensor 16, symbolically shown in FIG. 1, which generates a signal when the paper supply has been completely or nearly exhausted. Paper 10 is drawn from roller 12 to a first pair of rollers 18 and 20 which form part of the paper feed mechanism of the apparatus. Roller 20 is driven by motor 22 through a toothed belt or chain 24 by means of a conventional drive gear provided at the end of roller 20. Roller 18 is a free-wheeling roller which is journaled to the housing. Throughout this description it may be implicitly assumed that each of the elements are fixed, journaled, mounted, or otherwise connected to a housing and structure which surrounds the elements shown in FIG. 1. The housing provides a light-tight enclosure and the matrix for fixing the relative position of the elements as illustrated.

The opposing end of a driven roller 20 is also provided with a conventional drive gear and a toothed belt or chain 26 which engages a second drive gear provided at the end of a similarly driven roller 28 which is also combined with a freely journaled roller 30. Rollers 28 and 30 form a pair of feed rollers similar to rollers 18 and 20. Roller pair 18 and 20 and pair 28 and 30, as well as the other rollers described below included within apparatus 14, are composed of a resilient elastomer which is carbon loaded according so that each of the rollers is partially conductive to prevent the accumulation of static charges which might otherwise be formed or accumulate on the surface of paper 10 and which would, if allowed to accumulate, substantially interfere with proper image formation and development in the paper. Alternatively, instead of carbon loading the rollers, each of the rollers may be formed around a copper or conductive bristle core, similar in shape and configuration to a Christmas garland or bristle brush, around which the elastomer has been formed thereby imbedding the conductive bristle within the roller. In either case, a central metallic axis forms a core in the roller which extends through the bearings which journal the roller relative to the supporting housing to which the roller is rotatably fixed. The central metallic core or axis of the roller (not shown) serves as a central electrode which is electrically grounded to the housing so that the partially conductive roller is maintained at a ground potential. Grounding of the rotating metallic core, which extends through the bearing, is accomplished by a number of conventional means, including the use of a conductive wiper or bearing point fixed to the grounded frame at one end and at the opposing end having a conductive contact bearing against the rotating metallic core.

As best seen in FIG. 4 a conventional cutter bar is disposed between pair of rollers 18 and 20 and pair of rollers 28 and 30. Cutter bar 32 includes a stationary bar 34 and a moveable cutting knife 36. Knife 36 is coupled by means of a reciprocating rod 38 to an eccentrically mounted pin 40 on drive wheel 42. Drive wheel 42 in turn is selectively driven by a second motor 44. Paper drawn through first pair of rollers 18 and 20 is moved between bar 34 and knife 36 when the bar is in the opened position to the second pair of roller 28 and 30. After a predetermined amount of paper has been moved through the two pairs of rollers, cutting bar 32 is selectively actuated by means of motor 34 to cut the continuous sheet of paper to a predetermined length.

The paper is then transported from roller pair 28 and 30 to a similar antistatic driven roller 46 which is driven by means of toothed belt or chain 48 coupled to a gear on driven roller 28. Roller 46 drives paper 10 upwardly to a printing station defined between roller 46 and an upper pair of rollers 48 and 50. Upper roller 48 is in turn driven by means of a toothed belt or chain 52 which couples rollers 46 and 48 in a conventional manner.

Referring now to both FIGS. 1 and 4, the printing station defined between rollers 46 and 48 includes a flat platen 54 which is forwardly biased by spring loaded pins 56. Platen 54 is also connected to a solenoid 58 which selectively positions platen 54 in either the forward printing position when solenoid 58 is nonactuated, or in a retracted feed position when solenoid 58 is actuated. Photosensitive paper 10 is drawn up through the printing station between platen 54 and a flat face plate 60 of a cathode ray tube 62. In the printing mode, the video image is produced on face plate 60 with solenoid 58 nonactuated. Platen 54 is then urged by means of spring loaded pins 56 against face plate 60 to tightly press paper 10 between face plate 60 and platen 54. The position of platen 54 is sensed by a microswitch 64 which is symbolically illustrated in FIG. 1.

Face plate 60 is a fiber optic plate disposed on a six inch diagonal cathode ray tube 62 and having a useful screen size of approximately four by three inches. The phosphor on the back of face plate 60 is excited by the electrode gun of cathode ray tube 62. It has been determined that electrophoretically deposited phosphor provides the resolution required in medical applications which is not achievable by phosphors deposited or formed on fiber optic face plates according to other conventional methodology.

Cathode ray tube 62 is mounted in a chassis 66 which rides on a pair of transverse rails 68. Rails 68 are generally oriented in a horizontal direction parallel to the horizontal axis of paper 10 when in the print station, which horizontal axis is perpendicular to the direction of movement of paper 10 through the print station. A stepping motor 70 is selectively controlled and coupled through a rack and pinion gear mechanism 72 to selectively position chassis 66 and therefore face plate 60 relative to paper 10 in the print station along the horizontal axis of the paper.

Figure 2:
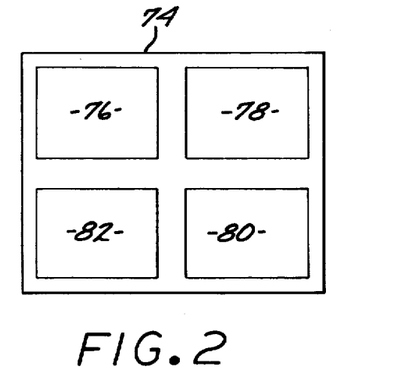
FIG. 2 is a plan view of a single developed sheet which has been exposed in a first format.
Figure 3:
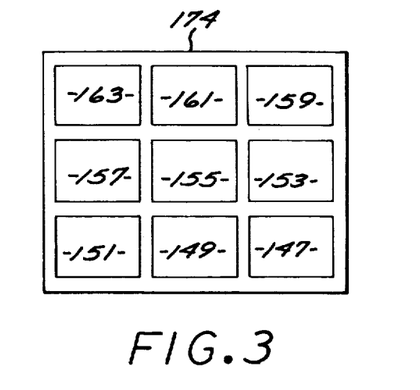
FIG. 3 is a plan view of a single developed sheet which has been exposed in a second format.

Referring to FIG. 2, a full frame exposure of face plate 60 may be made on a paper sheet 74 by exposing the video image on a face plate 60 to form a latent image denoted by reference numeral 80 on the right hand side of the sheet. Face plate 60 is then moved by means of stepping motor 70 to form a latent image 82 on the left hand side of the half of sheet 74. After images 80 and 82 are formed, sheet 10 is vertically advanced through print station and two additional latent images 78 and 76 are similarly imprinted on sheet 74 to form a two-by-two array as illustrated in FIG. 2. The 3×3 format is similarly printed by sequential exposure of frames 147-163 in a similar manner as shown in FIG. 3.

During normal operation, stepping motor 70 is selectively controlled by a microprocessor which tracks the position of chassis 66 or face plate 60 relative to paper 10. However, a sensor 84 is symbolically shown in FIG.

1 as a microswitch contacting one edge of chasis 66 to provide a reference signal to reset the position of face plate 60 in the event that the location of face plate 60 should be lost or miscalculated by the microprocessor at any time. Chassis 66 is shown as connected to a second chassis 86 which contains the electronics of apparatus 14 or cathode ray tube 62 which may be carried or translated with chassis 66 as suggested in FIGS. 1 and 4 or may be rigidly connected to the surrounding frame and to chassis 66 through a flexible ribbon connector.

After exposure to face plate 60, paper 10 is pulled upwardly through roller pair 48 and 50 to roller 88 and thermal developing drum 90. Paper 10 is provided with a conventional coating which causes the latent images imprinted in paper 10 to become visible and fixed upon the application of controlled amount of heat through heat drum 90. The heat from drum 90 is monitored by a heat sensor 92 to prevent operation of apparatus 14 before sufficient heat has been developed in drum 90. Drum 90 is powered by a third motor 94 coupled in a conventional manner to an end gear drive (not shown). A drive gear 96 provided at one end of drum 90 engages, in turn, a toothed belt 100 which conventionally drives a feed roller 104 which bears against an idler roller 102. Developed paper from drum 90 is directed toward rollers 102 and 104 and then delivered to an exterior delivery tray 114 shown in FIG. 4 which is either directly accessible to the user as suggested by FIG. 4 or protected by a removable transparent plate (not shown).

Figure 5:
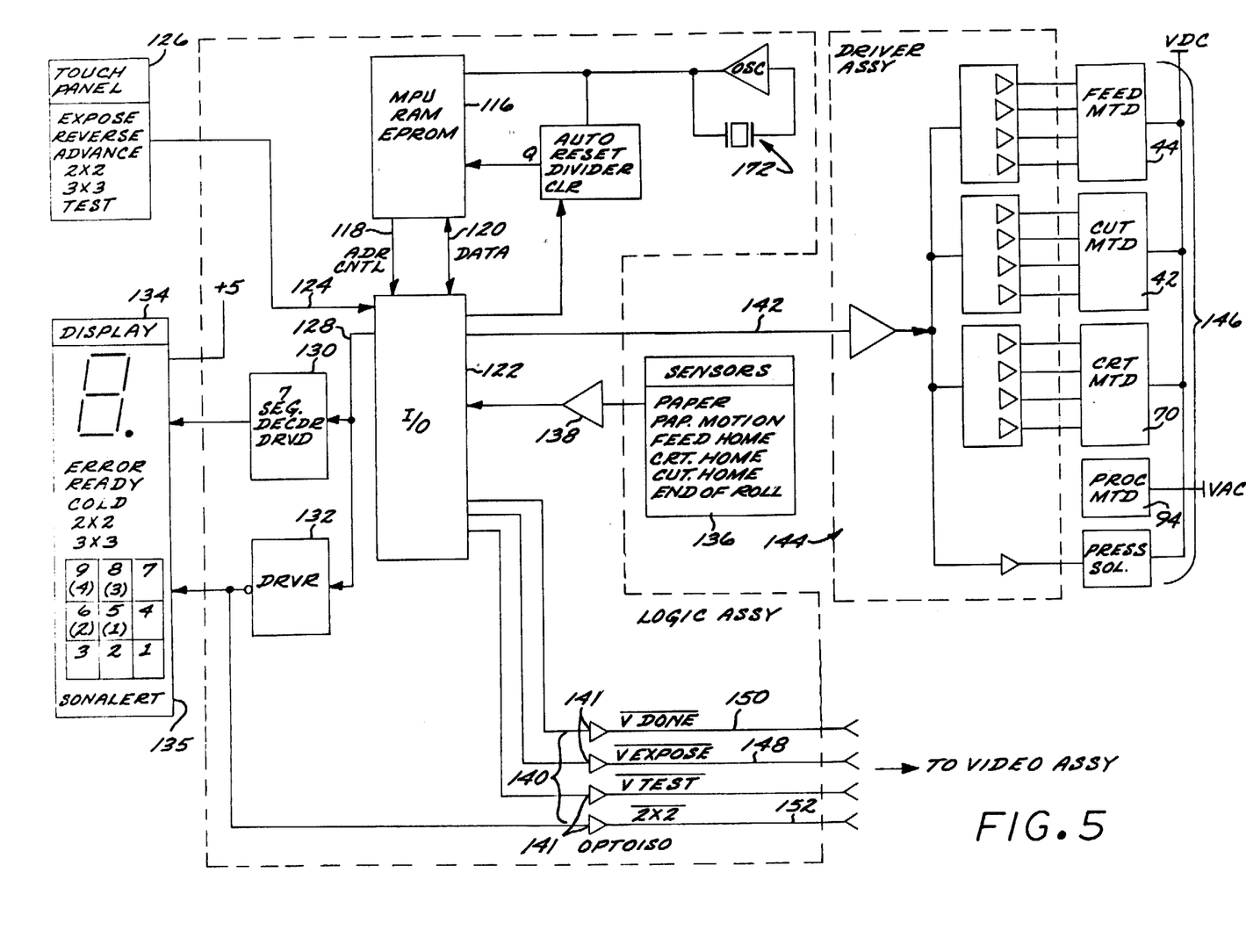
FIG. 5 is a schematic diagram of circuitry used to control the apparatus of FIGS. 1 and 4 to produce the printed formats shown in FIGS. 2 and 3.

Referring now to FIG. 5 which shows a block diagram of the circuitry, which controls each of the motors and the elements shown and described in connection with FIGS. 1 and 4, control is effected by a processor 116 which operates in response to programmed options and in response to the various sensors also described in connection with FIG. 1. Processor 116 includes both random access memory and programmable memory.

Conventional programming techniques are employed by processor 116. Processor 116 communicates through a plurality of discrete control signals on control bus 118 and bidirectionally on data base 120 with an input-output (I/O) circuit 122. I/O circuit 122 in turn has a plurality of inputs 124 from a touch panel 126 which is user operated to programmably instruct processor 116. In addition, I/O circuit 122 has a plurality of outputs 128 coupled to a segment driver 130 and a second driver 132 to power a plurality of lighted ouput displays 134. The plurality of sensors included within apparatus 14 are shown diagrammatically as circuit block 136 and are provided as an additional plurality of inputs through buffer 138 into I/O circuit 122. The video circuit included within chassis 66 of FIG. 1 includes a number of inputs and outputs, collectively denoted by reference numeral 140, used to command the operation of cathode ray tube 62. Finally, I/O circuit 122 has a plurality of output driver signals on motor control bus 142 which communicate through a driver assembly, generally denoted by reference numeral 144, to a corresponding plurality of control motors described in connection with FIG. 1 and collectively denoted in FIG. 5 by reference numeral 146.

The circuitry of the present invention, including the methodology of the invention, may now be understood by considering the control effected by the circuitry as shown in FIG. 5 of the mechanism described in FIGS. 1 and 4 which control results in the production of multiformatted hardcopy output as shown in FIGS. 2 and 3.

After apparatus 14 is turned on, microprocessor 116 will intialize all circuitry and light a "cold" indicator lamp in display panel 134 until such time as heat sensor 92 shown in FIG. 1 indicates that developing drum 90 has obtained an operable temperature. At such time, processor 116 will extinguish the "cold" indicator lamp in display panel 134. Cathode ray tube 62 and paper 10 are then initialized in their start position within the print station as described in connection with FIG. 1 by processor 116. The user then selects one of two printing formats by actuating the appropriate control button in touch panel 126. This sends a corresponding discrete command signal on bus 124 to I/O circuit 122. In the presently preferred embodiment the user has the initial option of selecting either a 2×2 array as shown in FIG. 2 or a 3×3 array as shown in FIG. 3. According to the format selected, processor 116 displays the total number of frames of the array to be printed by transmitting a data output signal to I/O circuit 122 and segment driver 130 and thence to an LED segmented display on display panel 134.

After the user selects the array format through touch panel 126, a numeral 4 or 9 is displayed in display panel 134 and CRT 62 and paper 10 are appropriately positioned within the print station of apparatus 14. The user then determines whether or not he desires a hardcopy of the video signal generated by the medical device to which apparatus 14 is coupled. If the user does desire a hardcopy, he activates an EXPOSE button in touch panel 126 which then causes processor 116, through I/O circuit 122, to activate the VEXPOSE signal on line 148 with the result that the video signal from the medical device is reproduced on face plate 60 of CRT 62. If the 2×2 format is selected frame 80 as shown in FIG. 2 is exposed for a predetermined duration as determined by processor 116. After exposure, the circuitry of CRT 62 generates a return signal DONE on line 150 coupled to I/O circuit 122. Circuitry 86 with CRT 62 is a high performance video monitor circuit featuring high resolution, low geometric distortion and high uniform brightness. Such a film recorder monitor and its associated circuitry is a modified version of a monitor well known to the art and is presently manufactured as an ASM model camera film recorder monitor by Aspect Electronics of Sunnville, Calif. The modifications made to teh ASM model are well within the known design principles to adopt the conventional monitor to the system described here. Photographic exposure control of CRT 62 is implemented by controlling the CRT blanking signal. This process is operator initiated by depressing the expose button on the control panel. The microprocessor then relays this request for exposure to the on board exposure control of the CRT assembly. This circuitry starts the exposure to coincide with the first line of the next video frame and terminates the exposure after a preprogrammed duration. A video invert capability is included within circuitry 86 and is exploited by central processor 154 to provide a simple data processing capability within apparatus 14, whereby a negative picture of the video signal coupled to CRT 62 is presented on face plate 60. The video signal from the object medical device is directly coupled to the video input of circuitry 86 while the control signals on video bus 140 described in FIG. 5 are coupled to I/O circuit 122 through conventional optical isolators 141.

In the example illustrated, the 2×2 format was selected with the result that processor 116 generates an appropriate command format signal for the circuitry of the cathode ray tube, which in this case is routed through I/O circuit 122 to driver 132 which activates a 2×2 array indicator lamp in display panel 134. As a matter of convenience, the 2×2 signal is taken from driver 132 and coupled by means of line 152 to CRT 62. Otherwise, the 3×3 format will be the format assumed by processor 116 and a 3×3 indicator lamp will similarly be lit in display panel 134 with the 2×2 indicator format signal, FORMAT 2×2, on line 152 going inactive. This will be interpreted by CRT 62 as a 3×3 command signal.

As shown in FIGS. 2 and 3 the same size sheet 74 is used in the case of the 2×2 array and as in the case of the 3×3 array. Therefore, the X and Y gain on CRT 62 is appropriately reduced in circuitry 86 on receipt of the 3×3 command to a smaller frame size to fill approximately one-third the horizontal width of the sheet 74. Similarly, an indicator lamp is lit in display panel 134 among the array lamps, symbolically illustrated and denoted by reference numeral 135. Array 135 physically simulates the page format illustrated in FIGS. 2 and 3. Thus, in addition to a digit between 1 and 9 being displayed in the LED output of display panel 134, one lamp of a 3×3 array 135 will be lit indicating which frame of the multiple format is being exposed. The nine positions of array 135 for the 3×3 page format of FIG. 3 are symbolically shown by numeral 1 through 9, while the positions corresponding to the 2×2 page format of FIG. 2 are symbolically shown by numerals (1)–(4).

After the first frame has been exposed, processor 116 will automatically advance CRT 62 and paper 10 in the print station of apparatus 14 to the next appropriate location. Continuing with the example of the 2×2 array, processor 116 automatically advances CRT 62 in preparation of exposure of frame 82 shown in FIG. 2, indicates a numeral 3 in the LED display of display panel 134 and blinks a lamp (2) behind geometric array 135, similating the page format shown in FIG. 2. A new video signal or the same video signal, which may be digitally manipulated or reversed in contrast, is then coupled to CRT 62 from the object medical device to which apparatus 14 is coupled. If the user desires to make a hardcopy exposure of the second video image, the user then depresses the EXPOSE switch on touch panel 126 and the process is repeated. The user also has the option of reversing the contrast of an image by activating a REVERSE switch in touch panel 126 in which case the optical negative of the image from the object medical device will be printed. In addition, the user may actuate an advance button on touch panel 126 which will cause processor 116 to terminate the remainder of that format and transport that sheet to the developer for processing. The test switch causes processor 116 to generate a prestored test pattern which is used for evaluation of the graphic output of apparatus 14. The VTEST signal on video bus 140 in FIG. 5 forces circuitry 86 of FIGS. 1 and 4 into the test mode.

Therefore, after frame 82 in FIG. 2 is exposed, paper 10 is advance within the print station and CRT 62 is returned to the left hand side of the print station in readiness for exposure of frame 78. In the same manner, the 3×3 exposure of FIG. 3 is exposed beginning at the lower right hand frame 154 through the upper left hand frame 158 in response to the user's commands as formatted by processor 116.

Figure 6:
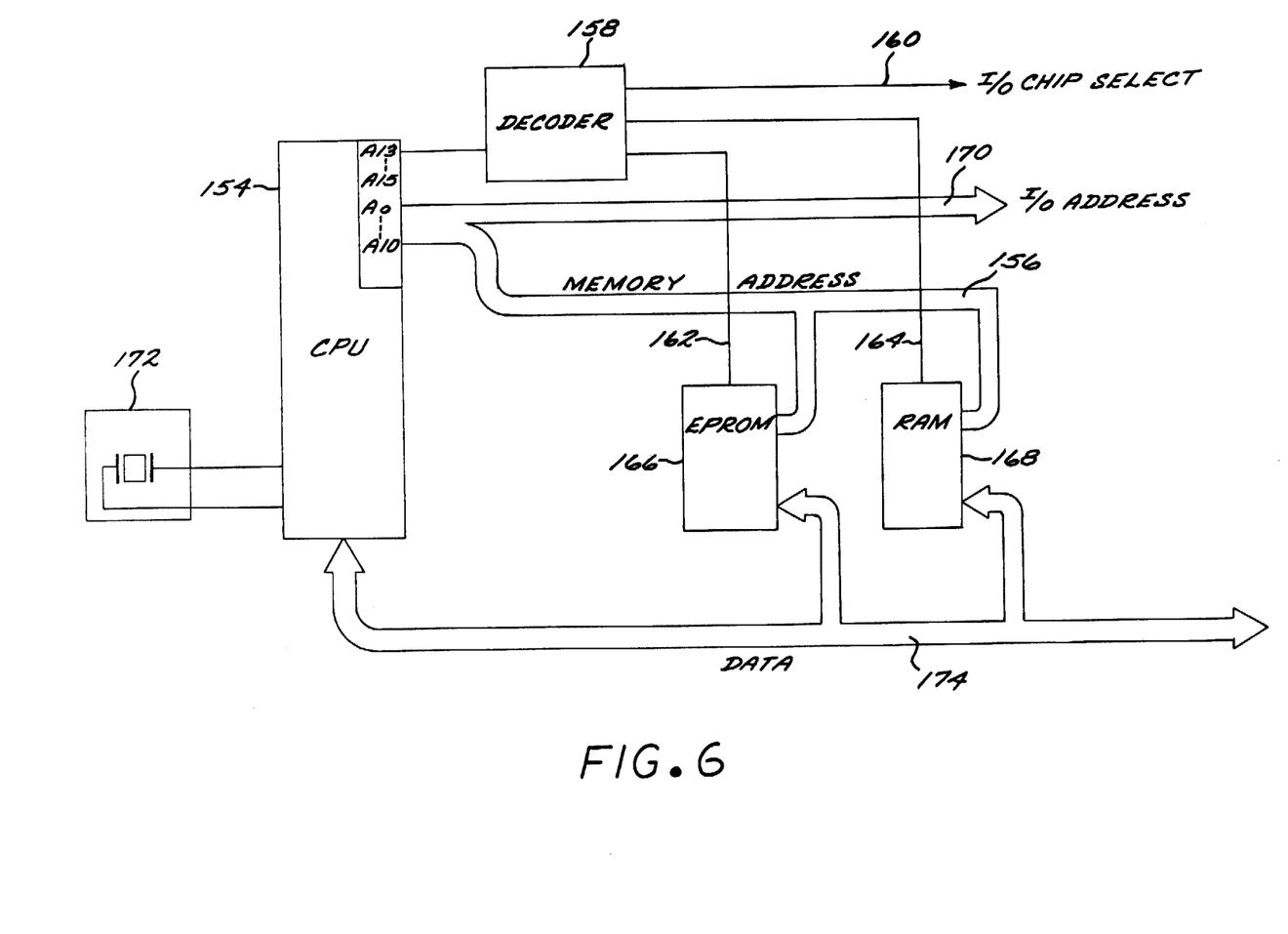
FIG. 6 is a block schematic of the microcontroller illustrated in the block schematic of FIG. 5.

One possible bus organization for a central processor (CPU) 154 included as part of processor 116 is illustrated in FIG. 6. Processor 116 would thus include a conventional central processor 154 having 16 address pins. The address pins are formed into three buses with address pins A0–A10 forming an 11 bit memory address bus 156. Address pins A13–A15 are coupled to a decoder 158 whose output is organized into a four bit input/output chip select bus described in greater connection with FIG. 7 and into two discrete chip select lines 162 and 164 to respectively select a programmable memory (PROM) 166 or random access memory (RAM) 168. PROM 166 is used to store the program which directs control of CPU 154 while RAM 168 serves as a scratch memory in a conventional manner for use during the execution of the program and to store user input commands or data entered through touch panel 126. Address lines A0–A3 are also used to form an input/output address bus 170. CPU 154 is driven by an external clock circuit 172. CPU 154 has an eight bit data bus 174 coupled between CPU 154, programmable memory 166 and random access memory 168.

Figure 7:
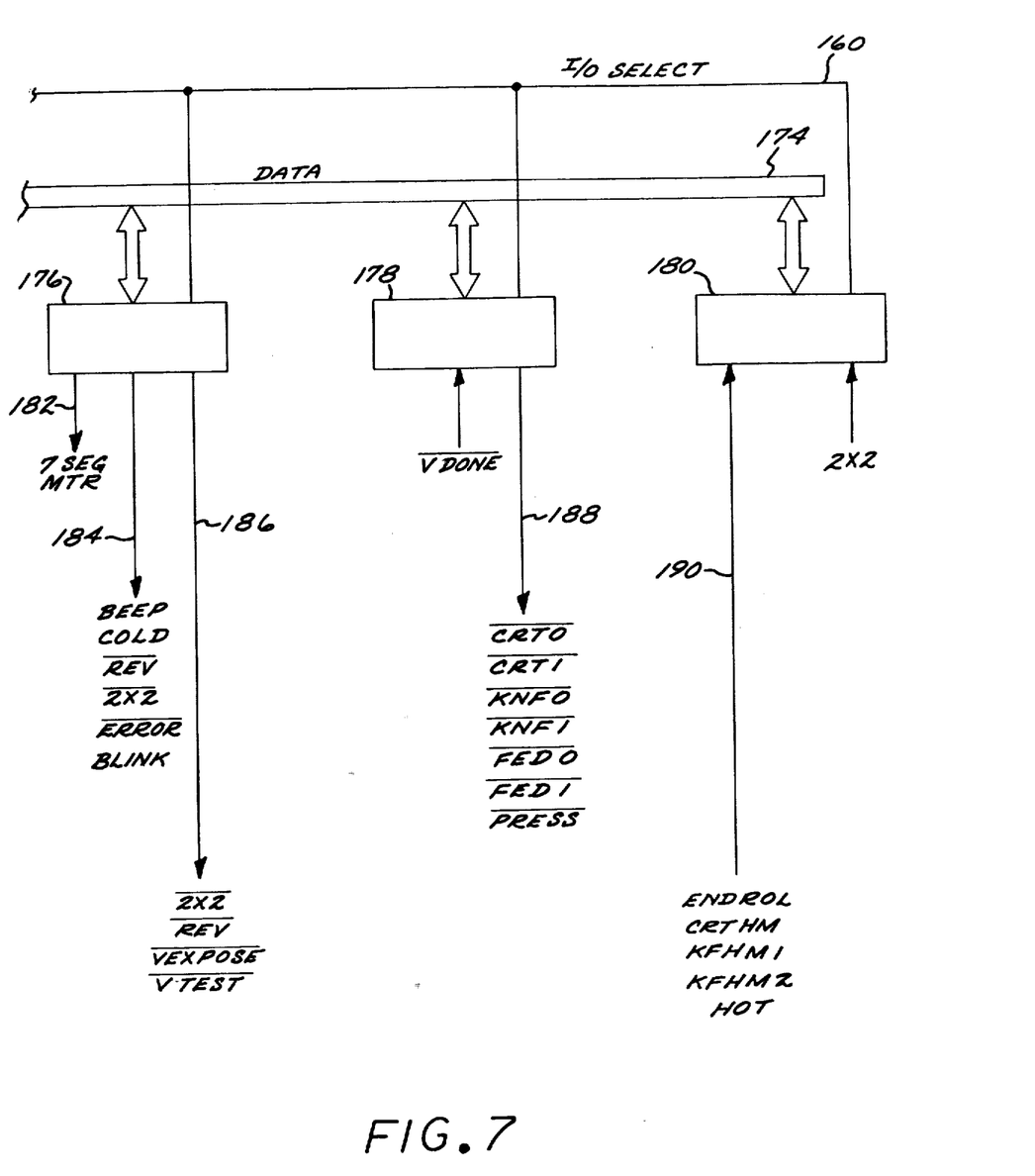
FIG. 7 is a block schematic of the input/output circuit illustrated in the block schematic of FIG. 5.

Referring now to FIG. 7, I/O circuit 122 is shown as including three input/output (I/O) decoder and latch circuits 176–180. Each of the circuits 176–180 are coupled to data bus 174 from CPU 154 in FIG. 6 and input/output select bus 160 from decoder 158. Beginning with I/O circuit 176, the outputs of I/O circuit 176 can be associated into three groups. The first group of output signals on lines 182 are coupled to display panel 132 and include the seven segment signals, 7SEG used to drive the LED display of display panel 134 and four matrix signals, MTR, used to selectively drive array 135. A second group of lines 184 include six command signals which are led to blind panel lamp indicators and an audio transducer, SONALERT, used to provide an audio feedback each time the user activates one of the input switches in touch panel 126. The audio driving signal is denoted as BEEP; the temperature indicator relating to processing drum 90 is denoted by COLD; a reverse contrast lamp indicator is designated as REV; the 2×2 array signal is designated as 2×2; a system error signal, ERROR, is used to indicate when a malfunction has occurred at some point within the operation of apparatus 14 and to provide a visual indicator to the user of that fact; and a blinking signal, BLINK, which is an intermittent signal used in the display panel to periodically flash any lamp as appropriate in a conventional manner to draw attention to its value or status.

The third group of output lines 186 from I/O circuit 176 are the video command signals, shown in FIG. 5 as coupled to the CRT circuitry. These include four signals from I/O circuit 176 and one line from I/O circuit 178, namely 2×2, REV, VEXPOSED, VDONE, VTEST, each described above in connection with FIG. 5 and signifying respectively: the format to be generated; the contrast to be generated; the initiation of exposure; the completion of the exposure; and the test pattern.

I/O circuit 178 also includes a second group of output signals which are discrete command signals for various motors and solenoids within apparatus 14, which signals are grouped as lines 188. These solenoids and motor command signals include left and right CRT stepping motor pulses, CRT0 and CRT1, coupled to stepping motor 192; knife commands, KNF0 and KNF1, to position cutting bar 32 in one of two configurations, namely opened and shut; and two feed commands, FED0 and FED1 used to activate the drive of paper feed motor 22; and a solenoid command, PRESS, to activate solenoid 58 coupled to platen 54. Each of the motors are shown in FIG. 5 and diagrammatically schematically in FIG. 1.

Similarly, I/O decoder 180 has a group of input signals 190 generated by the various sensors described above in connection with FIG. 1, namely; a input signal, ENDROL, indicating the exhaustion of paper 10 on roller 12; an input signal, CRTHM, indicating the positioning of CRT 62 at its home or initial position and generated by sensor 84; two knife position signals, KFHM 1 and KFHM 2 indicating the configuration of cutting bar 32 in a open or closed position; and a temperature sensor signal, HOT, generated by sensor 92 indicating that drum 90 has achieved the appropriate operating temperature. In addition, I/O circuit 180 includes an 8 bit switch which inserts a fixed word, 2×2, into I/O circuit 180 when the user powers up the system, thereby instructing CPU 154 to appropriately format the output of apparatus 14 in the format of FIG. 2, otherwise the format of FIG. 3, the 3×3 array, will be produced. The use of three I/O circuits 176–180 instead of one is merely an artifact of manufacture and one module could be used equally as well if such a mofule had sufficient capacity. However, given the economics of the present market, it is necessary to use a chip select signal generated by CPU 154 on input/output select bus 160 to select one of the I/O circuits 176–180 to appropriately access data bus 174 for the transfer of the desired command or information signals.

It must be understood that many alterations and modifications may be made by those have ordinary skill in the art without departing from the scope of the present invention. For example, although the programmable array has been shown as selected between one of two output formats, it is entirely within the scope of the present invention that touch panel 126 could include a keyboard with which a virtually arbitrary number of formats could be selected and executed by processor 116 if desired.

The preferred embodiment has been described only for the purposes of clarity and illustration and is not to be taken as defining or limiting the scope of the invention as set forth in the following claims.

We claim:

1. A method for printing video images on a multi-image hard copy comprising the steps of:
   controllably positioning a photosensitive medium in contact with a flat rectangular fiber optic faceplate on a cathode ray tube wherein said faceplate includes a phosphor thereon;
   selectively activating said phosphor on said fiber optic faceplate in response to a video signal applied to said cathode ray tube to generate a corresponding lumininescent pattern of a complete image on said faceplate;
   exposing said photosensitive medium to said pattern generated on said faceplate to permanently imprint the complete image of said pattern on said photosensitive medium in contact with said faceplate;
   selectively shifting said photosensitive medium relative to said faceplate in each of two different directions to a plurality of different relative positions and exposing said photosensitive medium to a complete image on said faceplate in at least some of said positions to produce an array of multiple complete images on a single section of said medium;
   moving said medium to a means for developing and fixing said pattern imprinted in said medium into a permanent, visual image; and
   delivering said developed and fixed medium for visual user inspection, whereby a video signal corresponding to said complete image is coupled to said cathode ray tube and imprinted on said medium to produce a permanent visual image therein through the use of a phosphor-bearing fiber optic faceplate in contact with said medium to produce a high resolution hard copy image at high speeds.

2. The method of claim 1 wherein said two dimensional array is configured in a selected one of a plurality of possible formats.

3. An apparatus for high speed, high resolution multiple format printing of complete video images comprising:
   a supply for supplying photosensitive medium;
   a printing means for exposing said photosensitive medium including a flat platen;
   first means for moving said photosensitive medium from said supply to and through said printing means;
   a cathode ray tube having a faceplate for disposition against said photosensitive medium, said photosensitive medium being moved by said first means between said faceplate and said platen, said platen being selectively actuated to press said photosensitive medium against said faceplate, said cathode ray tube being selectively translated with respect to said photosensitive medium in a direction generally perpendicular to the direction of movement of said photosensitive medium relative to said cathode ray tube and said platen, said video image being reproduced on said faceplate of said cathode ray tube, said photosensitive medium between said faceplate and said platen being selectively exposed to said video image to form a latent image in said photosensitive medium, said faceplate having displayed thereon by said cathode ray tube a full frame video image with each point of said video image being simultaneously imprinted on said photosensitive medium;
   second means for selectively translating said cathode ray tube with respect to said photosensitive medium;
   developing means for fixing said latent image imprinted into said photosensitive medium, said photosensitive medium being moved to and through said developing means from said printing means by said first means after said photosensitive medium has been selectively exposed to said full frame video images on said faceplate of said cathode ray tube; and
   third means for controlling the movement of said photosensitive medium through said apparatus, and for controlling the operation of said apparatus and the selective disposition of said cathode ray tube by said second means with respect to said photosensitive medium in said printing means, said third means being coupled to said first means, to said platen, to said cathode ray tube, to said second means, and to said developing means, whereby high speed, high resolution multiformatted images are imprinted on photosensitive medium to form hard copies in a selected one of a plurality of formats.

4. The apparatus of claim 3 wherein said faceplate of said cathode ray tube includes an electrophoretically deposited phosphor thereon activated by said cathode ray tube, wherein high resolution images are contact printed at high speed with a full frame exposure on said photosensitive photosensitive medium paper.

5. The apparatus of claim 4 wherein said third means includes a digital processor, digital memory, and an input/output circuit, said processor being coupled to said memory and input/output circuit through an address, memory and data bus, said third means further including a user input circuit coupled to said processor through said input/output circuit whereby a user may programmably instruct said processor to generate instructions for and coupled to said printing means, first means for moving photosensitive medium, cathode ray tube and second means to expose said photosensitive photosensitive medium and said printing means according to a selected one of a plurality of formats selected through said user input circuit in response to user activation.

6. The apparatus of claim 3 wherein said first means for moving said photosensitive medium from said supply to and through said printing means includes a plurality of rollers wherein each said roller is conductive and each roller is electrically grounded.

7. The apparatus of claim 6 wherein each said roller is made of an elastomeric substance and is rendered conductive by carbon loading.

8. The apparatus of claim 6 wherein each said roller is made of an elastomeric substance and is rendered conductive by a metallic bristled core.

9. A high speed, high resolution camera comprising
a cathode ray tube having a fiber optic faceplate for contact against a photosensitive medium,
means for positioning the photosensitive medium against the fiber optic faceplate to expose a full frame video image on an area of said medium coextensive with the full frame video image while the medium is so positioned,
control means for causing said faceplate to display a full frame video image and to expose said full frame video image on said photosensitive medium for a predetermined duration to thereby imprint said image on said photosensitive medium,
means for developing and fixing the image imprinted on said medium into a permanent, visual image,
means for moving said photosensitive medium from said faceplate to said means for developing and fixing, and
means for delivering said developed and fixed medium for visual user inspection, whereby a video signal corresponding to said image is coupled to said cathode ray tube and imprinted on said medium to produce a permanent visual image therein through the use of said fiber optic faceplate in contact with said medium to produce a high resolution hard copy image at high speeds.

10. The camera of claim 9 wherein the photosensitive medium has a photosensitive layer using a dry silver photoreactant.

11. The camera of claim 9 wherein said means for positioning the photosensitive medium comprises a platen positioned adjacent said faceplate, and means for moving said photosensitive medium between said faceplate and platen to be pressed against the faceplate by the platen.

12. An apparatus for high speed, high resolution printing of complete video images comprising:
a supply for supplying photosensitive medium;
a printing means for exposing said photosensitive medium including a platen;
first means for moving said photosensitive medium from said supply to and through said printing means;
a cathode ray tube having a faceplate for disposition against said photosensitive medium, said photosensitive medium being moved by said first means between said faceplate and said platen, said platen being selectively actuated to press said photosensitive medium against said faceplate, said video image being reproduced on said faceplate of said cathode ray tube, said photosensitive medium between said faceplate and said platen being selectively exposed to said video image to form a latent image in said photosensitive medium, said faceplate having displayed thereon by said cathode ray tube a full frame video image with each point of said video image being simultaneously imprinted on said photosensitive medium;
developing means for fixing said latent image imprinted into said photosensitive medium, said photosensitive medium being moved to and through said developing means from said printing means by said first means after said photosensitive medium has been selectively exposed to said full frame video images on said faceplate of said cathode ray tube; and
third means for controlling the movement of said photosensitive medium through said apparatus, and for controlling the operation of said apparatus, said third means being coupled to said first means, to said platen, to said cathode ray tube, and to said developing means, whereby high speed, high resolution images are imprinted on said photosensitive medium to form hard copies of video images reproduced on said faceplate.

* * * * *

UNITED STATES PATENT AND TRADEMARK OFFICE
CERTIFICATE OF CORRECTION

PATENT NO. : 4,484,233

DATED : November 20, 1984

INVENTOR(S) : Emery G. Strout and Armen N. Mancini

It is certified that error appears in the above-identified patent and that said Letters Patent is hereby corrected as shown below:

Column 13, line 8, (first occurrence), delete "photosensitive".

Column 13, line 20, (first occurrence), delete "photosensitive".

Signed and Sealed this

Second Day of July 1985

[SEAL]

Attest:

DONALD J. QUIGG

Attesting Officer     Acting Commissioner of Patents and Trademarks